Nov. 20, 1928.
L. C. FULLER
1,692,406
CHANGE SPEED TRANSMISSION GEAR
Filed Feb. 9, 1925  3 Sheets-Sheet 1
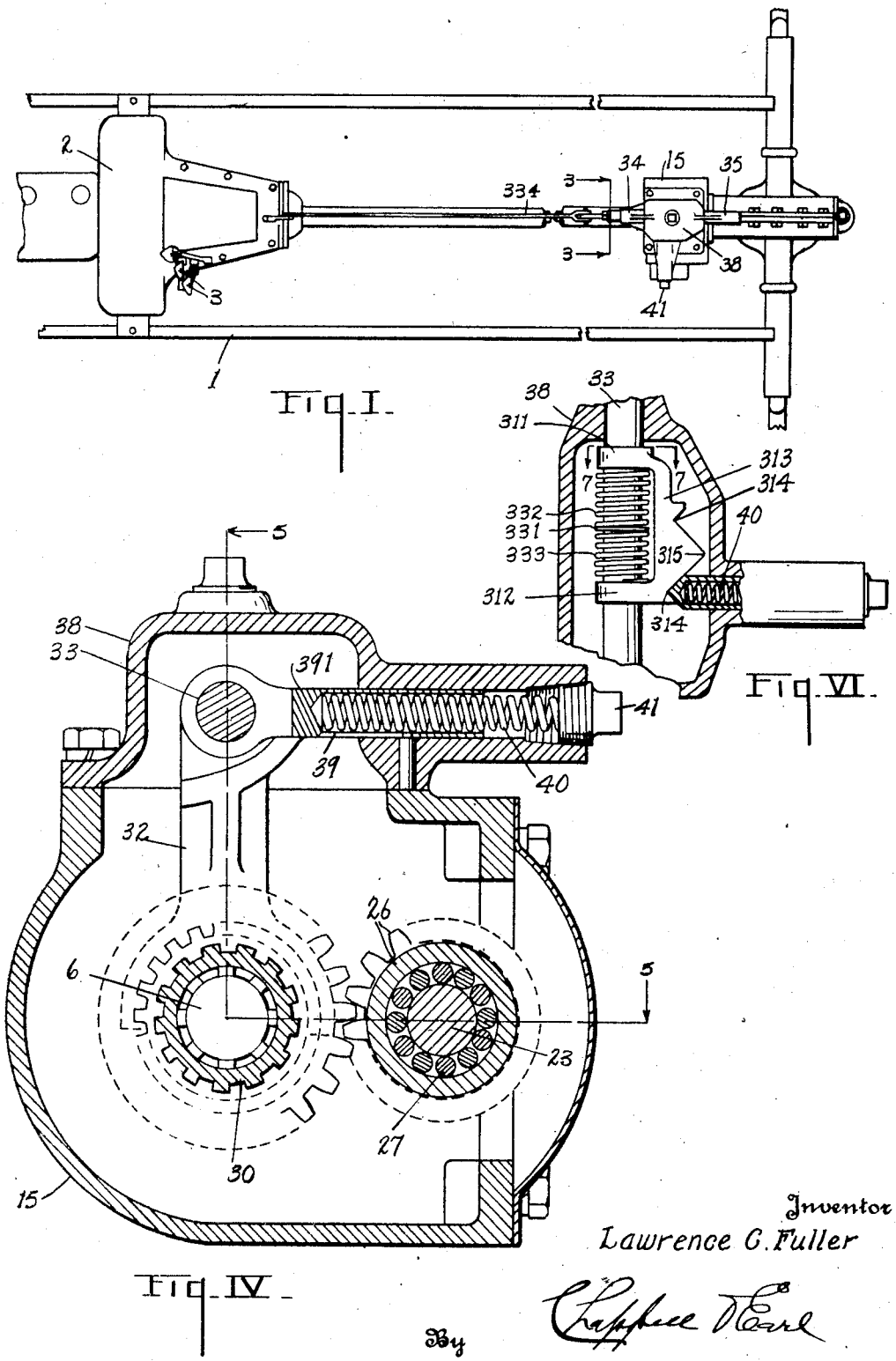
Inventor
Lawrence C. Fuller
By
Attorneys

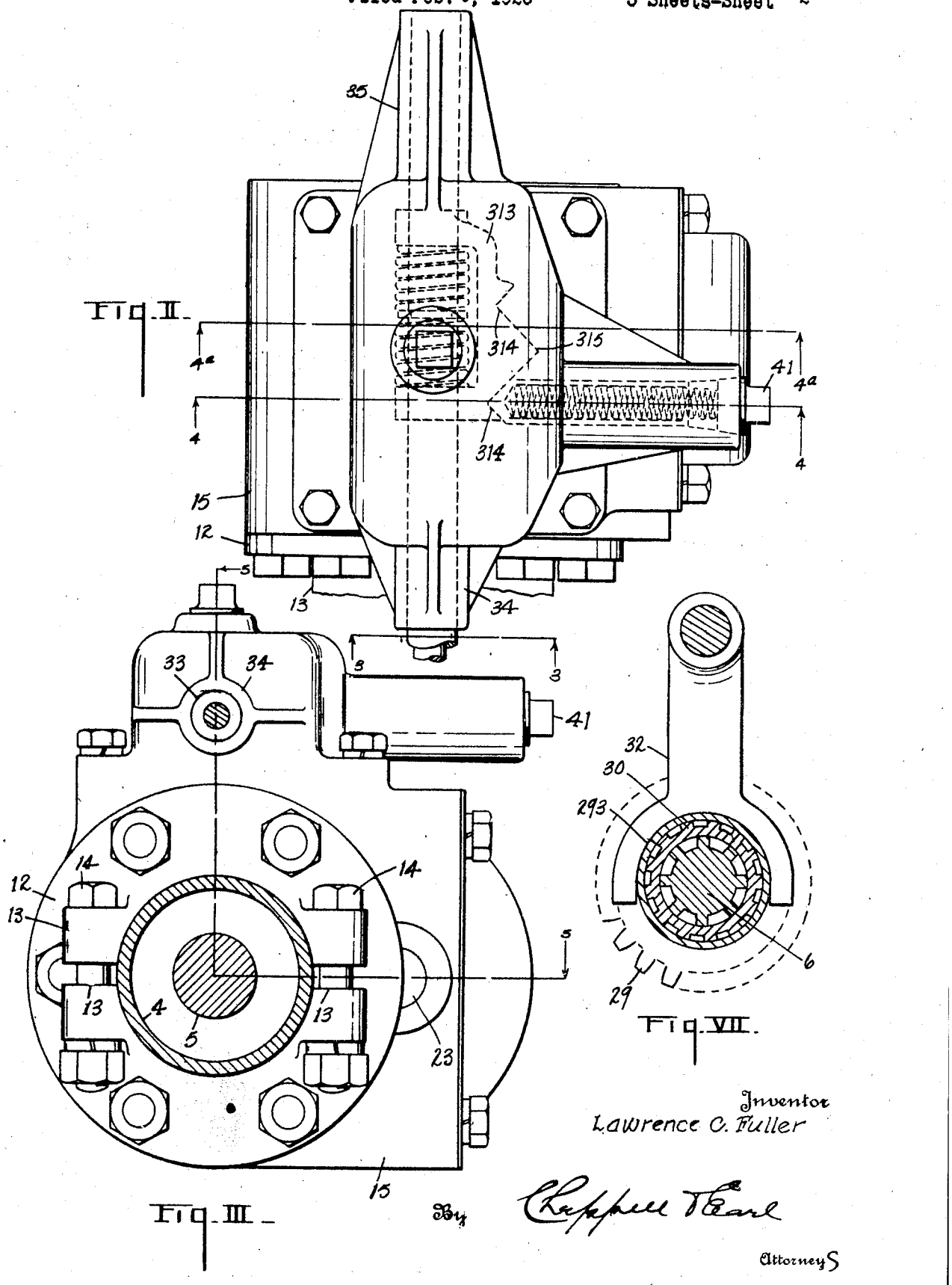

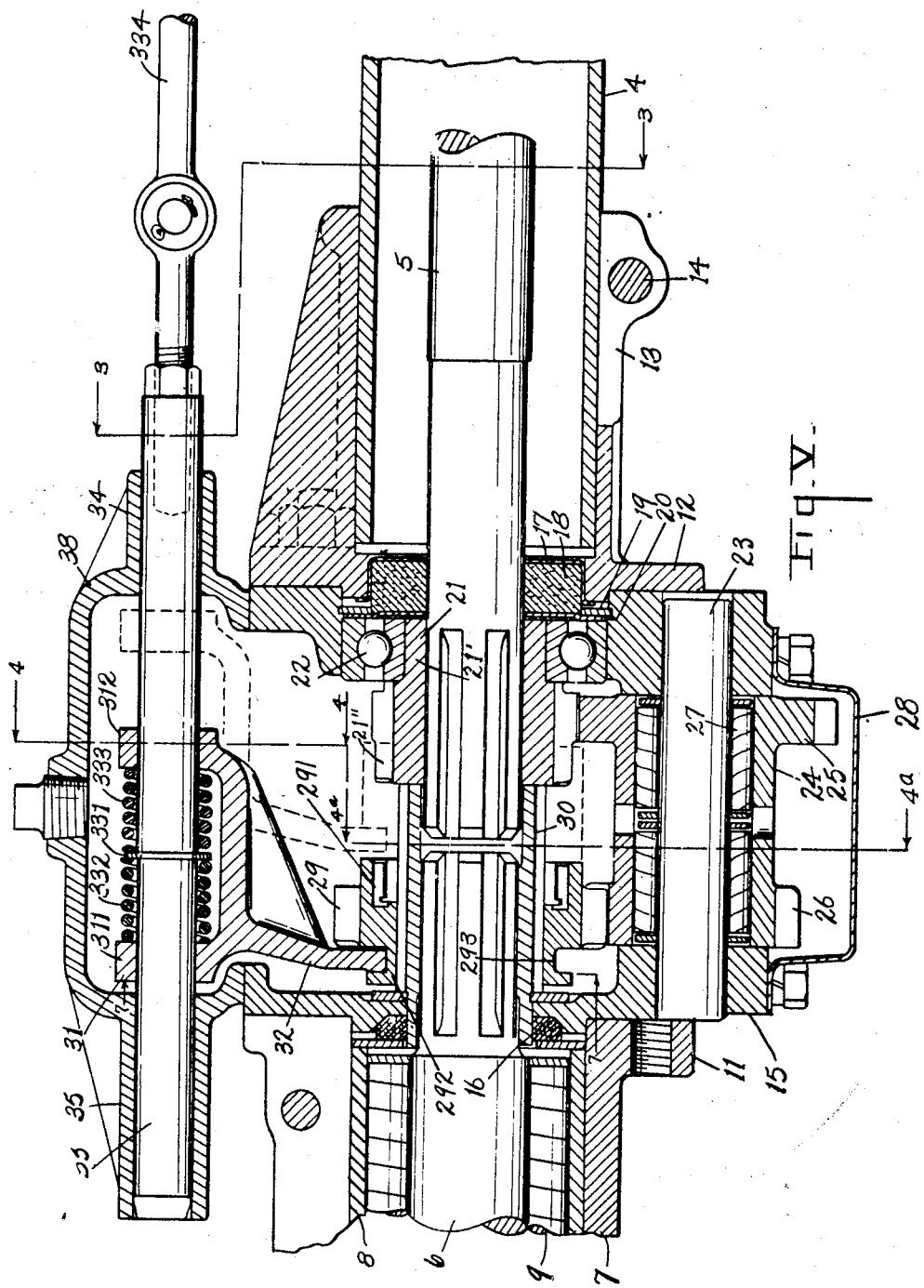

Patented Nov. 20, 1928.

1,692,406

UNITED STATES PATENT OFFICE.

LAWRENCE C. FULLER, OF KALAMAZOO, MICHIGAN.

CHANGE-SPEED TRANSMISSION GEAR.

Application filed February 9, 1925. Serial No. 7,928.

This invention relates to improvements in change speed transmission gears for automobiles.

The objects of the invention are:

First, to provide an improved construction of double speed range transmission gears.

Second, to provide by an attachment means such a combination for a Ford automobile or truck.

Third, to provide an improved shift means in such a structure in which the shift, from high to low or low to high, shall be, at the point of shift, automatic and strong and not subject to the uncertain movement of a driver.

Further objects and objects relating to details and economies of construction and operation will definitely appear from the detailed description to follow.

I accomplish the objects of the invention by the devices and means described in the following specification. The invention is defined and pointed out in the claims. A structure which is a preferred embodiment of the invention is clearly illustrated in the accompanying drawing, forming a part of this specification, in which:

Fig. I is a detail partial assembly plan view of the frame and regular transmission of a Ford automobile, with my improved double range attachment incorporated.

Fig. II is an enlarged detail plan of my attachment, the propeller shaft being broken off.

Fig. III is an enlarged transverse sectional view taken on line 3—3 of Figs. I, II and V, showing the main parts of my attachment in elevation.

Fig. IV is a transverse detail sectional elevation view taken on the irregular plane indicated by lines 4—4—4ª—4ª of Figs. II and V, showing details of the shifter and gears.

Fig. V is an enlarged detail longitudinal section, taken part in elevation and part in plan as indicated by the angular section line 5—5 of Figs. II and IV, showing the shift gear and the shifter, clutch and related parts.

Fig. VI is an enlarged detail plan of the shifter and its automatic spring bolt.

Fig. VII is an end elevation view of the shifter and gear partially in section, taken on line 7—7 of Figs. V and VI.

In the drawing similar numerals of reference refer to similar parts throughout the several views and the section lines are taken looking in the direction of the little arrows at the ends of the section lines.

The parts of the drawing will be designated by their numerals of reference. 1 is the frame. 2 is the regular Ford transmission with its usual control pedal levers 3. 4 is the propeller shaft tube. 5 is the propeller shaft and 6 is the worm shaft in the usual splined form at the point of coupling in a Ford truck. In a Ford passenger car the propeller shaft would be cut or divided at this point. 7 is the rear axle housing of the usual construction of Ford automobile or truck. 8 is the bushing for the worm roller bearing 9, which is here illustrated as a Hyatt.

To add my attachment to a Ford construction, it is only necessary to cut off a short part of the rear end of the propeller shaft tube or case. I make use of the joint flange on the axle housing and apply my auxiliary transmission housing by a flange 12 secured by divided clamp 13 held in place by bolts 14 (see Figs. III and V). The body of the housing 15 is secured between the axle housing and flange 12. At the axle end the usual packing joint 16, made up of metal and felt washer, is retained in place. At the front end a packing cup 17 fitted with a fiber or felt washer 18 and with retaining washers 19 and 20, is provided for the shaft section 5. A driving gear 21 is splined and fixed on the rear end of the propeller shaft section 5. A ball bearing 22 is interposed between the hub 21' of the gear 21 and the housing 15. The other end of the hub 21" is dentated and forms the inner member of the clutch member for direct drive.

Supported on fixed shaft 23 is the intermediate double pinion 24, the large pinion 25 being in permanent mesh with gear 21 and the smaller pinion 26 being arranged to engage and disengage the sliding shift gear Pinion 24 is preferably on roller bearings 27. A removable cover 28 gives access to these parts. The sliding shift gear 29 is splined to slide on a sleeve 30 secured to the end of the worm shaft 6 and loosely and revolubly embraces the rear end of the propeller shaft 5. The forward face of gear 29 is extended into an internally toothed clutch member 291 to coact with the teeth 21″ of the clutch member of gear 21. Rear hub 292 of the gear 29 is grooved at 293 to receive the forked arm of the shifter.

The shifter 31 is provided with a forked arm 32 which engages the groove 293 of the sliding gear. The shifter 31 is carried on shift rod 33 slidable in suitable bearings 34, 35 in the shifter housing 38 secured to the housing 15. The shifter is yieldingly supported on the rod by stops 311 and 312 made integral with the shifter 31, through which the rod is adapted to reciprocate. A collar 331 is fixed on the rod between the stops 311 and 312 and compression springs 332 and 333 are each side of collar 331 to afford a yielding connection to facilitate the throw of the shifter. The side of the shifter 31 is provided with retaining notches 314 at each end and an angular cam portion 315 therebetween to cam the shifter past its center in either direction. Co-operating with these notches and cam is a spring bolt 39 transversely disposed in said shifter housing 38 with angular end 391 urged into engagement with the notches and cam by compression spring 40, retained by screw plug 41. A connection 334 is provided for shifter rod 33. A series of pinions might be provided where more than one shift of gears is desired.

I have utilized the parts of the Ford automobile fully and have provided a simple and powerful auxiliary shift gear for the main transmission. It does not have a neutral or reverse and consequently secures the double range of shifts without complications in the main transmission or interference with its functions.

I desire to claim the invention specifically as an attachment or auxiliary and also broadly as pointed out in the appended claims.

Having thus described my invention, what I claim as new and desire to secure by Letters Patent is:

1. The combination in a structure of the class described comprising a shiftable member having two operative positions and an intermediate neutral position, of a reciprocating control rod, a shifter yoke for said shiftable member provided with arms slidably mounted on said rod, said rod being provided with a collar between said arms, springs arranged on said rod between said collar and the arms of said yoke, said yoke being provided with a pointed cam projection and with notches at each side thereof, and a spring pressed detent coacting with one of said notches when said shiftable member is in one of its operative positions and with the other of said notches when in the other of its operative positions, said detent coacting with said cam to cause a complete actuation of said shifter yoke after the crown of the cam has passed the detent thereby preventing the stopping of said shiftable member in its neutral position.

2. The combination in a structure of the class described comprising a shiftable member having two operative positions and an intermediate neutral position, of a reciprocating control rod, a shifter yoke for said shiftable member provided with arms slidably mounted on said rod, said rod being provided with a collar between said arms, springs arranged on said rod between said collar and the arms of said yoke, said yoke being provided with a cam, and a spring pressed detent coacting with said cam to cause a complete actuation of said shifter yoke after the crown of the cam has passed the detent, thereby preventing the stopping of said shiftable member in its neutral position.

3. The combination in a structure of the class described, comprising a shiftable member having two operative positions and an intermediate neutral position, of a shifter operatively associated with said shiftable member, an actuating member for said shifter having a yielding connection thereto, said shifter being provided with a pointed cam projection and with notches at each side thereof, and a spring pressed detent coacting with one of said notches when said shiftable member is in one of its operative positions and with the other of said notches when in the other of its operative positions, said detent coacting with said cam to cause a complete actuation of said shifter after the crown of the cam has passed the detent, thereby preventing the stopping of said shiftable member in its neutral position.

4. The combination in a structure of the class described, comprising a shiftable member having two operative positions and an intermediate neutral position, of a shifter operatively associated with said shiftable member, an actuating member for said shifter having a yielding connection thereto, said shifter being provided with a cam, and a spring pressed detent coacting with said cam to cause a complete actuation of said shifter after the crown of the cam has passed the detent thereby preventing the stopping of said shiftable member in its neutral position.

5. In a gearing having an element to be shifted to two positions, a slidably mounted member having a connection therewith, a bar slidably mounted and movable relative to said slidably mounted member in opposite directions, there being resilient means interposed between the bar and slidably mounted member and acting to oppose relative movement in either direction between the bar and the slidably mounted member, resiliently stressed means bearing against said slidably mounted member to cause it to move from a central position to either of two extreme positions, a manual control remotely positioned relative to the slidably mounted member, and a link connection from the control to said bar.

In witness whereof I have hereunto set my hand.

LAWRENCE C. FULLER.